2,853,494

SUBSTITUTED 1,2,4-TRIOXANES, AND A PROCESS FOR THE PREPARATION THEREOF

Edward R. Bell, Concord, and George B. Payne, Berkeley, Calif., assignors to Shell Development Company, New York, N. Y., a corporation of Delaware No Drawing. Application April 5, 1954
Serial No. 421,179

6 Claims. (Cl. 260—340.3)

This invention pertains to certain novel heterocyclic compounds containing only carbon and oxygen atoms in the ring, and to a method for their preparation.

The compounds of this invention may be characterized as 1,2,4-trioxanes, and as having the general formula:

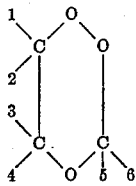

wherein the free valence bonds designated as 1 and 4, are each satisfied by a hydrogen atom or a monovalent organic radical, the free valence bonds designated 2 and 3 are each satisfied by a hydrogen atom, a monovalent organic radical or together by a divalent organic radical and wherein the free valence bonds designated 5 and 6 are each satisfied by a hydrogen atom, a monovalent organic radical or together by a divalent organic radical. The compounds of the invention may also be characterized by the general formula:

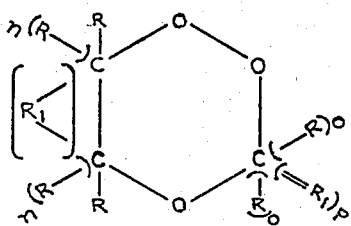

wherein each R signifies a radical selected from the group consisting of the hydrogen atom and monovalent organic radicals, each $R_1$ signifies a divalent organic radical, and $m$, $n$, $o$ and $p$ each represents a whole number selected from the group consisting of zero and 1, $n$ always being equal to one minus $m$, and $o$ always being equal to one minus $p$. It is preferred that the monovalent organic radicals be monovalent aliphatic hydrocarbon radicals, such as alkyl or aralkyl radicals, or aromatically unsaturated hydrocarbon radicals, such as aryl or alkaryl radicals. It is preferred that the divalent organic radicals be divalent hydrocarbon radicals in which the free valence bonds are located on different carbon atoms.

Examples of the preferred monovalent hydrocarbon radicals include such straight-chain alkyl radicals as the methyl, ethyl, butyl, pentyl and octyl radicals, such branched-chain alkyl groups as the isopropyl, sec-, and tert-butyl radicals, and the various branched-chain $C_6$, $C_7$, $C_9$ and $C_{10}$ alkyl radicals, and such aralkyl radicals as the benzyl radical, the cinnamyl radical, the phenyl ethyl radical, the naphthylmethyl radical and the like. Also included are such cycloalkyl radicals as the cyclohexyl, cyclopentyl and cyclooctyl radicals.

Included among the preferred divalent hydrocarbon radicals are the alkylene radicals, such as the ethylene, propylene or butylene radicals, and such aromatic radicals as the biphenylene radical.

The following compounds are exemplary of the invention and the structure of the compounds thereof:

(a) 3,3-dimethyl-1,2,4-trioxa-trans-decalin

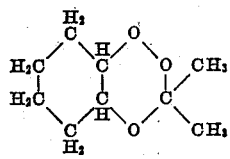

(b) 3,3,5-trimethyl-6-pentyl-1,2,4-trioxane

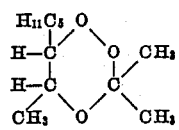

(c) 3-propyl-5-phenyl-1,2,4-trioxane

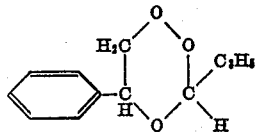

(d) 3,5-dimethyl-3-phenyl-1,2,4-trioxane

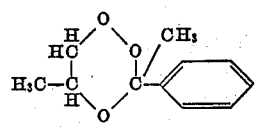

These novel compounds may be prepared by reacting (a) a compound subject to peracid attack with hydrogen peroxide in the presence of an inorganic peracid and a solvent followed by reacting (b) the product thus formed with a carbonylic compound—e. g., an aldehyde or a ketone.

The over-all net reactions in these stages are believed to be:

(a)
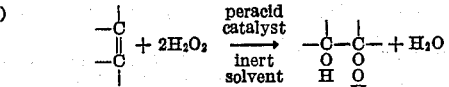

(b)
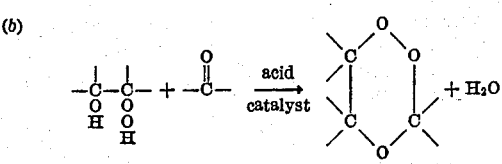

This generalized reaction is illustrated by the following equations which illustrate the reaction of, respectively, (a) cyclohexene with hydrogen peroxide and propionaldehyde and (b) 2-octene with hydrogen peroxide and (acetophenone).

(a)
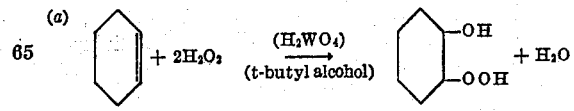

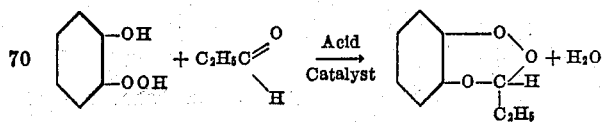

(b)

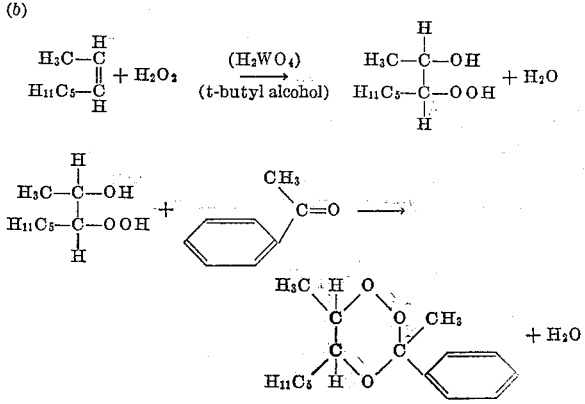

The novel compounds of the invention may be prepared according to the above reactions by one of two techniques. The choice of technique employed will depend primarily upon: (a) the reactivity of the ethylenic compound and (b) the reactivity of the carbonylic compound with hydrogen peroxide to form the ketone peroxide. Where the reactivity of the ethylenic compound is high, as in the cycloalkenes and 2-alkenes and the carbonylic compound does not react with hydrogen peroxide to form the ketone peroxide, the following procedure may be employed: the ethylenic compound, catalyst and hydrogen peroxide are all mixed with the carbonylic reactant which acts both as solvent for the hydrogen peroxide and as reactant and the mixture is heated gently. The desired product may then be separated from the mixture by extraction with a selective solvent. Where the reactivity of the ethylenic compound is not great, as in such compounds as the 1-alkenes, or the carbonylic compound will react with hydrogen peroxide to form the ketone peroxide, the following two-step procedure should be employed: the ethylenic reactant, catalyst and hydrogen peroxide are mixed in a suitable organic liquid which is inert to hydrogen peroxide attack and which is a good solvent for hydrogen peroxide and the mixture is slowly stirred while it is being gently heated. The intermediate product is then separated from the reaction mixture and is mixed with the aldehyde or ketone to which there is also added an acid catalyst. The mixture is then allowed to stand for a sufficient time to assure complete reaction and the desired product obtained by extraction of the mixture with a selective solvent.

As the peracid-sensitive reactant there may be employed any ethylenic compound—e. g., any compound containing at least one pair of carbon atoms of aliphatic character which are directly linked to each other by a double bond. Monoethylenic hydrocarbons which can be so used to produce the 1,2,4-trioxanes are, for example, the olefins such as ethylene, propylene, the normal butylenes, isobutylene, the amylenes, the hexylenes, diisobutylene, the dodecenes, cetene and the like; the cyclic olefins, of which cyclopentene, cyclohexene, the methyl cyclopentenes, the alkyl cyclohexenes such as the methyl cyclohexenes, the ethyl cyclohexenes, the isopropyl cyclohexenes, and the like are typical; and ethylenic aromatic hydrocarbons, examples of which are, for instance, styrene, methyl styrene, vinyl toluene, the phenyl cyclohexenes, and the like. Examples of poly-olefinic hydrocarbons of these types which can be so used are, for instance, 1,3-butadiene, the pentadienes, the hexadienes, cyclopentadiene, 1,3- and 1,4-cyclohexadiene, the methyl cyclopentadienes, the ethyl cyclohexadienes, the divinyl benzenes, vinyl cyclohexene, isopropenyl cyclohexene, phenyl butadiene, and the like. Substituted ethylenic hydrocarbons, including, for instance, ethylenic halides, can also be used successfully as the peracid-sensitive reactant.

Ethylenic carboxylic acids having a desirable low acidity, such as tiglic acid, oleic acid, linoleic, ricinoleic and other drying oil fatty acids, tetrahydrobenzoic acid, cyclohexylidene acetic acid, cinnamic acid, etc., are another class of ethylenic compounds which can be used as starting materials with advantage in the new process. Esters of these acids or other ethylenic acids such as acrylic acid, methacrylic acid, crotonic acid, vinyl acetic acid, sorbic acid and maleic acid with saturated or unsaturated alcohols, or esters of the previously mentioned ethylenic alcohols with carboxylic acids constitute another class of unsaturated compounds which can likewise be used. Examples of suitable esters are, for instance, methyl acrylate, ethyl methacrylate, propyl crotonate, allyl crotonate, allyl acetate, oleyl acetate, cyclohexyl acrylate, diethyl maleate, acrolein diacetate, oleyl cinnamate, ethyl linoleate, and the like. Ethylenic halides such as allyl chloride, crotyl bromide, methallyl chloride and the like are another type of ethylenic compound which can be employed as the peracid-sensitive reactant.

The preferred ethylenic compounds are those which contain no other elements than carbon, hydrogen, oxygen, sulfur and halogen (fluorine, chlorine, bromine or iodine).

As the carbonylic reactant there may be employed any compound which has as its primary reactive component the structure >C—O. Prefereably such compounds contain not more than 10 carbon atoms in each hydrocarbon group attached to one of the unsatisfied valencies of the carbon atoms shown and contain no olefinic unsaturation. Thus, the carbonylic reactant may be a saturated aliphatic or alicyclic ketone or aldehyde, such as the alkyl ketones or aldehydes, acetone, methyl ethyl ketone, ethyl propyl ketone, methyl nonyl ketone, chloroacetone, diisobutyl ketone, pinacolone, diamyl ketone, formaldehyde, acetaldehyde, propionaldehyde, butyraldehyde, isobutyraldehyde, caproaldehyde, enanthol and the like; such alicyclic ketones as cyclohexanone, cyclopentanone and methyl cyclohexyl ketone. The carbonylic reactant may also be an aromatic ketone or aldehyde, such as benzophenone, benzaldehyde, alpha-hydrindone and alpha-tetralone, or a mixed ketone such as acetophenone, propiophenone, tolyl methyl ketone and the like.

Any of the inorganic peracids known to be effective in promoting hydroxylation of ethylenic compounds by hydrogen peroxide can be used successfully as catalysts in the present process. The inorganic peracid catalysts can be formed in situ in the reaction mixture. Thus, acids or metal oxides which react readily with hydrogen peroxide to form peracids which are soluble in the reaction mixture and which are reduced by ethylenic compounds can be used. Peracids of tungsten, vanadium and molybdenum are typical examples of suitable catalysts. These peracids may be used in the form of the simple acids or as polyacids, including various heteropoly acid forms. Heteropoly acids of acid-forming elements of group VI of the periodic table, such as are described in copending application Serial No. 290,329, filed May 27, 1952, now U. S. Patent No. 2,754,325, issued July 10, 1956, are useful catalysts for the preparation of oxirane compounds according to the present invention. Heteropolytungstic acids of arsenic, or antimony, or bismuth are also suitable. Sulfuric acid is also effective as a catalyst for the reaction. While inorganic peracid catalysts derived from metals of groups III through VII of the periodic table can be used, it has been found that the tungstic acids are greatly superior to other catalysts due to their selectivity, i. e. their ability to promote the desired epoxidation with a minimum of undesirable oxidative side reactions. Tungstic acid, the preferred catalyst, also has the advantage of providing high reaction rates.

The hydrogen peroxide employed in the reaction may be in the form of an anhydrous gas or liquid or it may be in the form of an aqueous solution containing from about 10% to about 90% by weight of hydrogen peroxide. Particularly useful are the commercially available aqueous solutions containing from about 25% to about 60% by weight of hydrogen peroxide. It is preferable that the highest practical concentration of hydrogen peroxide consistent with safe handling be employed because the presence of higher concentrations of hydrogen peroxide in the reaction theatre depresses the formation of side products and results in the formation of greater yields of the desired intermediate product and/or final product. For the same reason, while it is quite feasible to employ stoichiometric quantities of hydrogen peroxide in the ethylenic reactant—e. g., two moles hydrogen peroxide per equivalent of ethylenic linkage present—it is desirable that the hydrogen peroxide be present in the reaction zone in an amount substantially in excess of the theoretical amount. A practical range for the mole ratio of the ethylenic reactant and hydrogen peroxide lies from about 1:2 to about 1:10, the ratios within the limits of from about 1:2.5 to about 1:3.5 being most effective.

The reaction may be carried out at atmospheric, superatmospheric or subatmospheric pressure as convenient. Preferred temperatures for effecting the reaction are of the order of −30° C. to about 100° C., and the time which will be required for completion of the reaction will depend in part upon the particular temperature chosen. Most preferably the reaction is carried out at a temperature of from about 0° C. to about 40° C., using the shortest reaction time consistent with adequate conversion of hydrogen peroxide. Usually reaction times of from about 1 to about 10 hours are sufficient.

The reaction of hydrogen peroxide and the ethylenic reactant is preferably carried out in liquid phase using an organic solvent in which hydrogen peroxide is readily soluble. In the case where the hydrogen peroxide is supplied as an aqueous solution the solvent preferably should also be miscible with water. It is essential that the solvent employed be relatively inert with respect to hydrogen peroxide under the conditions employed, but the solvent need not be inert with respect to the ethylenic reactant employed. Thus, where the ethylenic reactant is highly reactive and the carbonylic reactant is one which is relatively inert with respect to the hydrogen peroxide, the single-step technique previously outlined is eminently satisfactory for producing the desired 1,2,4-trioxane. In such case the carbonylic reactant may also be employed as a solvent.

Where, however, the ethylenic reactant is not highly reactive and/or the carbonylic reactant is vulnerable to attack by hydrogen peroxide, the two-step technique previously outlined should be employed. According to this technique the reaction between the hydrogen peroxide and the ethylenic reactant is carried out as heretofore described in the presence of an organic reactant which is inert to hydrogen peroxide, which preferably is miscible with water and which is a solvent for hydrogen peroxide and, preferably, also for the ethylenic reactant. Non-acidic organic solvents are preferred. Alcohols, hydroxy ethers, ketones and the like are suitable solvents. While any of the alcohols can be used, it is preferred to use alcohols which are less polar than the primary alcohols completely miscible with water. Tertiary alcohols such as tertiary butyl and tertiary amyl alcohols and the like have been found especially useful. Suitable hydroxy-ether solvents are, for instance, the ethylene glycol and diethylene glycol monoethers, particularly the ethyl ethers. Dioxane is another solvent which is useful in the process. Dimethyl formamide and sulfolane are other types of solvents which can be successfully used.

According to the two-step technique, the intermediate reaction product from hydrogen peroxide and the ethylenic reactant is separated from the reaction mixture and is then reacted with the carbonylic reactant in the presence of an acidic catalyst. This reaction is effected by simply mixing the intermediate product with the ketone or aldehyde and the catalyst at ordinary or slightly elevated temperatures. Accordingly, the reaction may be effected at any temperature of from about 0° C. to about 100° C., temperatures of from about 10° C. to about 40° C. being preferred.

The reactants may be employed in stoichiometric proportions—e. g., about 1 mole of carbonylic compound per equivalent of the structure

in the intermediate product but it is desirable that the carbonylic reactant be employed in substantial excess—up to perhaps two to five times the theoretical amount.

As the acid catalyst there may be employed any acid whose $pK_a$ is less than about 3. Included within this group are the mineral acids, sulfuric acid and phosphoric acid being representative, and such organic acids as oxalic acid, p-tolylsulfonic acid and the like. The acid catalysts employed in effecting the reaction of hydrogen peroxide with the ethylenic reactant are suitable for effecting the reaction of the carbonylic compound with the intermediate reaction product, though such compounds probably will be found too expensive for such purposes, other cheaper acid catalysts being equally effective.

The following examples are presented for the purpose of illustrating both the compounds and the process of the invention. These examples are intended to be illustrative in nature only.

*Example I*

3,3-dimethyl-1,2,4-trioxa-trans-decalin was prepared by the following procedure: to a mixture of 1 mole of cyclohexene, 500 ml. tert-butyl alcohol and 3 grams of tungstic acid in a 1-liter, 3-necked flask was added 2 moles of 90% hydrogen peroxide dropwise with stirring and cooling over a 30-minute period. Stirring was continued for 4 hours with intermittent cooling to maintain the temperature between 30 and 40° C. The mixture was allowed to stand overnight, was then diluted with an equal volume of water and was extracted continuously with ether from 9 to 10 hours. The extract was washed with five 100-ml. portions of saturated ammonium sulfate solution and dried over sodium sulfate. The ether was stripped under reduced pressure to a kettle temperature of 70° C. at 1 to 2 mm. pressure. One hundred grams of product was obtained. This product was mixed with 100 ml. of acetone, 500 ml. of petroleum ether and 100 ml. 3 N sulfuric acid and was stirred for 24 hours, at the end of which time the phases were separated. The oil phase was washed with three 100-ml. portions of 5% sodium bicarbonate and was dried over potassium carbonate. Distillation at 50–52° C. at 2 mm. pressure produced 45 grams of material whose index of refraction ($n$ 20/D) was 1.4619. The following analytical data were obtained for 3,3-dimethyl-1,2,4-trioxa-trans-decalin:

|  | Found | Calculated |
|---|---|---|
| Carbon, percent w | 62.7 | 62.8 |
| Hydrogen, percent w | 9.4 | 9.4 |
| Peroxide Value, eq./100 g | 0.56 | 0.58 |
| Molecular Weight | 170±3 | 172 |
| Infrared Spectrum | "compatible" | |
| Yield on Hydroperoxide | 100% | |
| Over-all Yield on Cyclohexene | 26% | |

*Example II*

3,3-dimethyl-1,2,4-trioxa-trans-decalin was prepared by a single-step technique: a mixture of 123 grams (1.5 moles) of cyclohexene, 5 grams of tungstic acid and 100 grams (1.0 mole) of 34% hydrogen peroxide in 500 ml. of acetone was stirred at 58° C. (gentle boiling) for four hours. The reaction maintained temperature for the first two hours. After removal of solvent and excess olefin the residue was shaken with a mixture of 500 ml. of water and 200 ml. of ether and allowed to separate overnight. The ether solution was dried over anhydrous magnesium sulfate and concentrated on the steam bath until the temperature reached 45° C. Claisen distillation followed by redistillation through a 2-foot packed column gave a product boiling at 42–44° C. at 1 mm. pressure. The peroxide value of this product was found to be 0.56 mole per 100 grams. The theory for 3,3-dimethyl-1,2,4-trioxa-trans-decalin is 0.58 mole per 100 grams. Analyses of the product gave percent C, 62.6 (theory for $C_9H_{16}O_3$—62.8); percent H, 9.4 (theory—9.4); percent O, 27.4 (theory—27.8). The yield was 24% based upon the $H_2O_2$ charged.

The reaction may be repeated, pervanadic acid being subtsituted for pertungstic acid in the foregoing procedure. The yield of the substituted trioxadecalin will be slightly less than that obtained in the preceding example.

*Example III*

Preparation of 3,3,5-trimethyl-6-pentyl-1,2,4-trioxane and its isomer 3,3,6-trimethyl-5-pentyl-1,2,4-trioxane: a mixture of 112 grams (1.0 mole) of 2-octene (containing 33% by volume 1-octene), 200 grams of 34% hydrogen peroxide, 1000 ml. of acetone and 10 grams of tungstic acid catalyst was stirred at 55–60° C. for eight hours. Solvent was then removed under vacuum on the water bath at 50° C. The bottoms product was diluted with water and extracted with two 250-ml. portions of benzene. The combined benzene extracts were washed with ice cold 1 N sodium hydroxide, then with water, and the extracts were dried over magnesium sulfate. Claisen distillation at 1 mm. pressure gave 28 grams of product, boiling point 46–48° C., index of refraction ($n20/D$) 1.4230. Analysis of the product gave percent C, 67.0; percent H, 11.5; peroxide value, 0.90 eq./100 grams. Analysis calculated for $C_{11}H_{22}O_3$: percent C, 65.3; percent H, 11.0; peroxide value, 0.99 eq./100 grams. Distillation of the bottoms through a 2-foot packed column afforded 16 grams more of the peroxide mixture, boiling point 40–50° C. (1 mm.), ($n$ 20/D) 1.4318. Analysis: percent C, 65.5; percent H, 11.2; peroxide value, 1.02 eq./100 grams.

*Example IV*

Preparation of 3,3-dimethyl-6-phenyl-1,2,4-trioxane and its isomer 3,3-dimethyl-5-phenyl-1,2,4-trioxane: in a 1-liter, 3-necked, round-bottom flask equipped with stirrer, condenser and dropping funnel was placed 104 grams (1.0 mole) of styrene, 500 ml. of tert-butyl alcohol (TBA) and 10 grams of tungstic acid. Seventy-six grams (2.0 moles) of 90% hydrogen peroxide was added dropwise with stirring below 40° C. over a period of one-half hour. The mixture was then stirred at 40° C. for seven hours and allowed to stand overnight at room temperature. After dilution with 3 liters of water, three 300-ml. portions of ether were used for extraction. The combined ether extracts were washed with half-saturated potassium carbonate solution, water, and dried over magnesium sulfate. The ether was removed in vacuo at 40° C. to give a residue of 92 grams which was dissolved in 300 ml. of acetone and treated with 5 grams of p-toluene sulfonic acid catalyst. After standing overnight at room temperature, the acetone solution was diluted with 1500 ml. of water and extracted with three 200-ml. portions of chloroform. The combined chloroform extracts were washed with dilute carbonate solution and water and dried over magnesium sulfate. After removal of the solvent, distillation was carried out at less than 1 mm. Hg pressure (Claisen). The product boiled in the range 73° C. to 90° C.

The product was identified by analysis and by the formation of identifiable derivatives thereof as the 1,2,4-trioxane. The yield was 28%, based on the $H_2O_2$ fed.

*Example V*

The process shown in Example IV was repeated, substituting for the acetone an equivalent amount of propionaldehyde. A product boiling at 80 to 82° C. at 1 mm. Hg pressure was identified by analysis and by formation of identifiable derivatives thereof as 3-propyl-6-phenyl-1,2,4-trioxane.

The novel cyclic peroxides have properties which adapt them for use in various organic reactions, as well as for other purposes. For example, some of the novel compounds may be used as additives to improve the cetane value of certain diesel fuels. Also, the novel compounds may be employed individually or in admixtures with one another, or with various other substances, as initiators and/or catalysts for various chemical reactions. Thus, these compounds may be used for effecting or promoting the polymerization of polymerizable unsaturated compounds both of the unconjugated type, such as diallylphthalate, and of the conjugated type, such as butadiene and the methylpentadienes.

We claim as our invention:

1. 3,3-dimethyl-1,2,4-trioxa-trans-decalin.
2. A process for the production of 3,3-dimethyl-1,2,4-trioxa-trans-decalin which comprises reacting cyclohexene with hydrogen peroxide and acetone in the presence of pertungstic acid at a temperature not to exceed 100° C.
3. A process for the production of 3,3,5-trimethyl-6-pentyl-1,2,4-trioxane which comprises reacting 2-octene with hydrogen peroxide and acetone in the presence of pertungstic acid at a temperature not to exceed 100° C.
4. 3,3,5-trimethyl-6-pentyl-1,2,4-trioxane.
5. A process for the production of 3,3-dimethyl-6-phenyl-1,2,4-trioxane which comprises reacting styrene with hydrogen peroxide in the presence of pertungstic acid at a temperature not to exceed 100° C. and reacting the reaction product with acetone in the presence of p-toluenesulfonic acid.
6. A process for the production of 1,2,4-trioxane which comprises reacting a member of the class consisting of alkenes, cycloalkenes and aralkenes with hydrogen peroxide and a member of the class consisting of acetone, propionaldehyde and acetophenone in the presence of pertungstic acid at a temperature not to exceed 100° C.

References Cited in the file of this patent

UNITED STATES PATENTS

| | | |
|---|---|---|
| 2,115,207 | Milas | Apr. 26, 1938 |
| 2,298,405 | Milas | Oct. 13, 1942 |
| 2,373,942 | Bergsteinsson | Apr. 17, 1945 |
| 2,437,648 | Milas | Mar. 9, 1948 |
| 2,455,569 | Dickey | Dec. 7, 1948 |
| 2,613,223 | Young | Oct. 7, 1952 |

OTHER REFERENCES

Milds: JACS, 58, 1302–4 (1936).
Leffler: Chem. Rev., 45, 403–13 (1949).
Beilstein: Hand. der Org. Chem., vol. XIX, page 381 (1934).
Beilstein: Hand. der Org. Chem., vol. XIX, page 399 (1934).
Chem. Abst., vol. 46, column 2996i (1952).